(No Model.)

W. SCHMACHTENBERG.
POCKET KNIFE.

No. 553,430. Patented Jan. 21, 1896.

WITNESSES:
Edward Thorpe
Theo. G. Hoster

INVENTOR
W. Schmachtenberg
BY
Munn & Co
ATTORNEYS.

UNITED STATES PATENT OFFICE.

WILLIAM SCHMACHTENBERG, OF NEW YORK, N. Y.

POCKET-KNIFE.

SPECIFICATION forming part of Letters Patent No. 553,430, dated January 21, 1896.

Application filed September 7, 1895. Serial No. 561,741. (No model.)

*To all whom it may concern:*

Be it known that I, WILLIAM SCHMACHTENBERG, of New York city, in the county and State of New York, have invented a new and Improved Pocket-Knife, of which the following is a full, clear, and exact description.

The object of the invention is to provide a new and improved pocket-knife or like article, arranged to permit the user to open the blades or other hinged parts of the knife in a very simple and convenient manner, and without the use of the finger-nails engaging the usual grooves in the side of the blade.

The invention consists principally of a lever fulcrumed in the knife handle or casing, and adapted to engage the knife-blade at or near its fulcrum end and swing the blade into an opening position.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1:
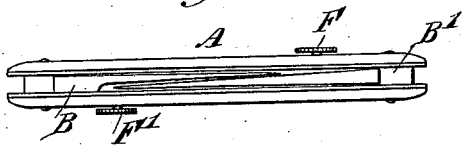
Figure 2:
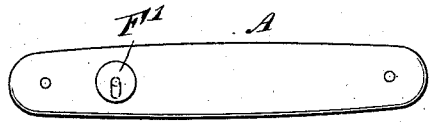
Figure 4:
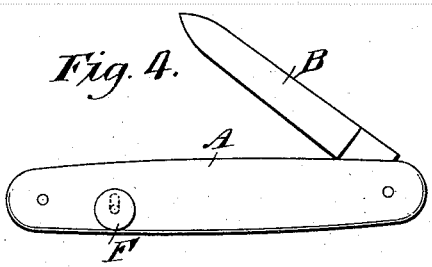
Figure 3:
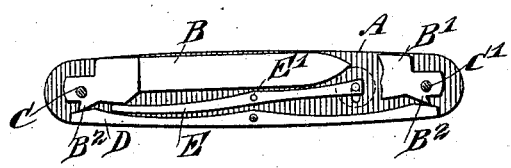

Figure 1 is a plan view of the improvement. Fig. 2 is a side elevation of the same. Fig. 3 is a sectional side elevation of the same. Fig. 4 is a side elevation of the same with one of the knife-blades in an open position, and Fig. 5 is a sectional side elevation of the same.

The improved pocket-knife, as illustrated in the drawings, is provided with a casing or handle A, in which are pivoted the two knife-blades B and B' on pivots C and C', respectively, held in the ends of the said casing. Each knife-blade is provided at its fulcrum end with a lug $B^2$ engaged by the free end of a main spring D secured at or near its middle in the knife-casing, as will be readily understood by reference to Figs. 3 and 5. Each knife-blade is engaged at its shank in front of the lug $B^2$ by the free end of a lever E, fulcrumed at or near its middle at E' in the casing A directly above the spring D, one lever extending on one side of the casing for the knife-blade B, while the lever for the other knife-blade extends on the opposite side of the casing A.

Figure 5:
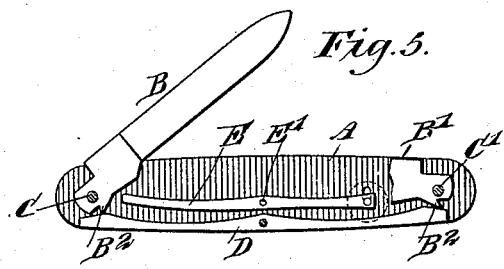

The outer end of each lever E carries a button F or F', the shank of which extends through a slot in the corresponding side of the casing A, so that the button is arranged on the outside of the casing, and when pressed downward causes a swinging of the lever E to swing the knife-blade B or B' slightly upward—that is, into a position until the lug $B^2$ passes a central position on the free end of the spring D—to cause the latter to swing the blade B or B' farther upward into the opening position shown in Figs. 4 and 5. Now when the knife-blade is in this position, the operator can readily take hold of the same to swing it into a final open position, in which it is held by the spring D in the usual manner.

It is understood that the free end of the spring D holds the knife-blade in either an open or closed position, and also swings the knife-blade into an open position after the said blade is once started by the lever E upon the operator pressing the button F or F' of the said lever.

Having thus fully described my invention, I claim as new and desire to secure by Letters Patent—

1. In a knife, the combination with a casing having a transversely elongated slot, of a blade pivoted in one end of the casing, the blade having a shank, a lever fulcrumed within the casing and having one terminal engaged with the shank of the blade, and a button having a shank movable through the slot in the casing, the button shank being connected to the lever and extended at right angles thereto, substantially as described.

2. In a knife, the combination with a casing having a transversely elongated slot in each end, of a blade pivoted in each end of the casing and each blade having a shank, a lever fulcrumed in the casing and having its terminals respectively engaged with the shanks of the blades, and two buttons each having a shank, the button shanks being respectively rigidly connected to the ends of the lever and extended at right angles thereto and through the respective slots in the casing, substantially as described.

WILLIAM SCHMACHTENBERG.

Witnesses:
THEO. G. HOSTER,
C. SEDGWICK.